C. W. SMITH.
PNEUMATIC WHEEL FOR AUTOMOBILES AND LIKE VEHICLES.
APPLICATION FILED JULY 17, 1920.
1,414,052.                                Patented Apr. 25, 1922.
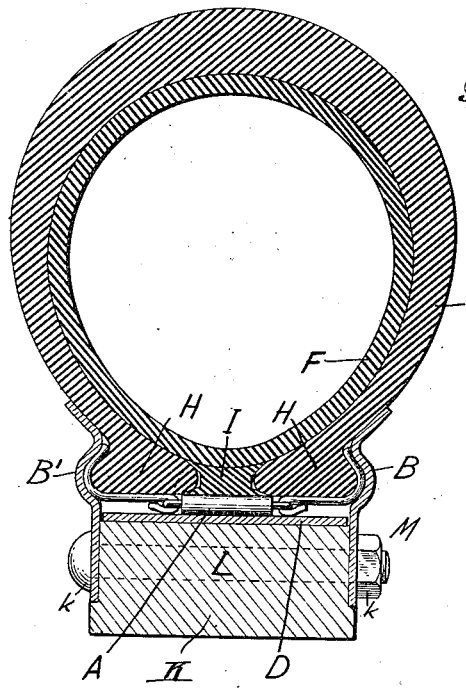
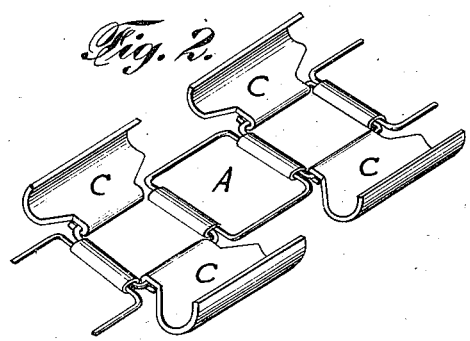
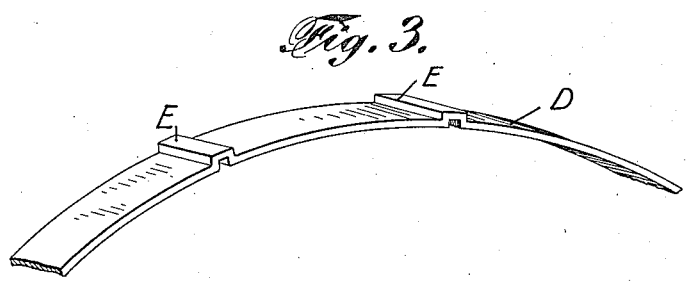
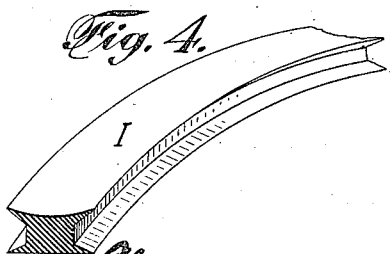

UNITED STATES PATENT OFFICE.

CLARENCE WILLIAM SMITH, OF COLD SPRINGS, NEW YORK.

PNEUMATIC WHEEL FOR AUTOMOBILES AND LIKE VEHICLES.

1,414,052.   Specification of Letters Patent.   Patented Apr. 25, 1922.

Application filed July 17, 1920. Serial No. 397,073.

*To all whom it may concern:*

Be it known that I, CLARENCE WILLIAM SMITH, a citizen of the United States, residing at Cold Springs, in the county of Putnam, in the State of New York, have invented an Improved Pneumatic Wheel for Automobiles and like Vehicles, and more particularly the detachable connecting means between the shoe and the felloe—namely, a removable clamp link chain, of which the following is a specification.

The objects of my improvement are:

1st. To provide detachable means for firmly holding the shoe to the felloe.

2nd. To provide (a) means for attaching easily and quickly the shoe to the felloe; (b) removable means for holding the beads of the shoe together closed over the tire while the shoe is on or off the wheel.

3rd. To provide a strong, durable, simple, light and cheap means for the above purposes.

Other objects will appear from the heretofore description.

The clamp link chain in conjunction with the side flanges is the feature of my improved wheel, the links of which are preferably made of steel or iron, and the clamps of ordinary commercial steel plate, the clamps rigid with the links or hinged to the links and preferably placed on every other link. The clamps are somewhat longer than the links and the outer edges are turned out so as to clasp the bead of the shoe on each side of the slot.

The accompanying drawings form part of this specification, in which Figure 1 is a cross section of the inner pneumatic tube, the shoe, the clamp link chain, the side flanges, the felloe, and its steel tire. Figure 2 is a perspective view of the clamp link chain. Figure 3 is a perspective view of an indefinite section of the steel tire which encloses the felloe, showing the ribs. Figure 4 is a perspective view of the rubber welt fitting in the slot of the shoe and showing at the forward end thereof the cross-section of said welt.

A is the clamp link chain of any convenient construction, wider than the slot of the shoe, surrounding the steel tire of the felloe and lying between it and the shoe, the first and last links of which loop over the inflating tube with a little circumferential play.

B and B' are the steel flanges bolted to either side of the felloe, reaching around the clamp C of the clamp link chain and the bead of the shoe and reaching up a short distance on the shoe.

C and C are the clamps of the clamp link chain, two preferably on every alternate link, curved to fit around the bead of the shoe and adapted to hold the bottom of the shoe from opening when the pneumatic tube is inflated, but adapted also to fit the inner curve of the rim B.

D is the steel tire enclosing the felloe and containing cross ribs E placed so as to come between the clamps C of the clamp link chain A and adapted to prevent circular sliding of the shoe and clamp link chain on the tire of the felloe.

F is the pneumatic tube of the wheel.

G is the shoe of the wheel enclosing the pneumatic tube and treading upon the ground.

H and H are the beads of the shoe.

I is a rubber welt fitted to the slot of the shoe, lapping over the upper and the lower edges of the slot and adapted when the tube is inflated to be compressed in the slot all around and to close the slot water tight and prevent the pneumatic tube from touching the clamp link chain.

K is the felloe, generally of wood, going all around the wheel and bound by the steel tire and on both sides by the flange and containing a shoulder *k* against which the lower edges of the rims B and B' bear to relieve the stress on the bolts L.

L are bolts fitting snug in the felloe K and securing the flanges to the felloe.

M is a nut screw-threaded to one end of the bolt L.

My improved wheel is assembled by taking the shoe by itself when off the wheel, opening the slot, and inserting the pneumatic tube uninflated. The rubber welt is inserted in the slot all around, its two ends in contact. The link clamp chain A is then placed all around the shoe G and the rubber welt I, the end links coming over and around the inflating tube of the pneumatic tube. The pneumatic tube may now be inflated off the wheel or it may be inflated after being put in place on the wheel. The nuts M are unscrewed from the bolts L all around and the side flange B is removed while the snug fit of the bolts leave the flange B' in place. The shoe containing the pneumatic tube F and the rubber welt I and the link clamp chain A being then off the wheel is slid onto the felloe K sidewise all around, the flange B put in place, the nuts screwed home and the wheel is then entire and ready for use. If not before inflated the pneumatic tube may now be inflated and the wheel is now in operating condition.

When a puncture occurs in the pneumatic tube or when it is worn and requires to be replaced, the reverse operations for removing it are carried out by unscrewing the nut M, removing the flange B, the clamp link chain, and the rubber welt, opening the shoe and removing the pneumatic tube, replacing it with another as the above described.

My improved wheel is adapted for the driving wheels of an automobile or for the steering wheels, and all the parts may be standardized and spare parts may be carried in the automobile; or the inflated pneumatic tube, the shoe, the rubber welt, and the link clamp chain all in place may be carried on the automobile ready to be installed in place of a defective pneumatic tube or shoe.

I do not confine myself to the materials, size, proportions, or construction specifically herein described, but changes may be made in all of them to adapt my clamp link chain and flanges to the various makes of wheel, without departing from the spirit of my invention as defined by the appended claims.

The clamps of the clamp link chain are preferably located in pairs on alternate links of the chain, hinged to the links or solid with the links, but the clamps may be spaced farther apart on every third or fourth link or even farther, but I prefer to have the clamps wherever placed extend along the beads of the shoe to within a short distance of each other to prevent the bulging out of the bead between the clamps. And the clamps may be much longer than a link, and they need not be in pairs, that is to say one clamp may be on one side of a link and the next clamp on the other side but I prefer them to be in pairs.

What I claim and desire to secure by Letters Patent are:—

1. In an automobile wheel, a clamp link chain, comprising clamps adapted to clasp the beads of the shoe.

2. In an automobile wheel, a clamp link chain, comprising clamps adapted to clasp the beads of the shoe and removable side flanges, adapted to hold the shoe to the felloe and also to release the shoe from the felloe when desired.

3. In an automobile wheel, a clamp link chain, comprising clamps adapted to clasp the beads of the shoe, removable side flanges adapted to hold the shoe to the felloe against side motion and a rubber welt filling the slot of the shoe.

4. In an automobile wheel, a clamp link chain adapted to clasp the beads of the shoe, and means for preventing the circumferential slipping of the shoe on the felloe.

5. In a vehicle wheel a clamp link chain, the clamps of which are adapted to hold the shoe from opening when off the wheel, and removable means for holding the shoe to the felloe against side motion.

In witness whereof, I have hereunto set my hand at this city, county and State of New York, this 8th day of July, 1920.

CLARENCE WILLIAM SMITH.

In presence of—
F. C. PLUME,
JOHN J. RANAGAN.